US010272533B2

(12) United States Patent
Satou

(10) Patent No.: US 10,272,533 B2
(45) Date of Patent: Apr. 30, 2019

(54) MACHINE TOOL

(71) Applicant: FANUC CORPORATION, Yamanashi (JP)

(72) Inventor: Naoki Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/808,922

(22) Filed: Nov. 10, 2017

(65) Prior Publication Data

US 2018/0133858 A1    May 17, 2018

(30) Foreign Application Priority Data

Nov. 11, 2016 (JP) ................. 2016-220993

(51) Int. Cl.
  *B23Q 11/12* (2006.01)
  *B23B 19/00* (2006.01)
  *B23Q 5/04* (2006.01)
  *B23Q 11/00* (2006.01)

(52) U.S. Cl.
  CPC .............. *B23Q 11/127* (2013.01); *B23Q 5/04* (2013.01); *B23Q 11/0003* (2013.01); *B23Q 11/12* (2013.01)

(58) Field of Classification Search
  CPC ... B23Q 11/0003; B23Q 11/12; B23Q 11/127; B23Q 5/04; B23B 19/00; B23B 19/02
  USPC .......................... 409/135, 136, 235, 231, 232
  See application file for complete search history.

(56) References Cited

U.S. PATENT DOCUMENTS

| 4,534,686 | A  | * | 8/1985  | Nakamura | ............... B23Q 5/10 310/59 |
| 4,580,471 | A  | * | 4/1986  | Oyama    | .................... B23Q 5/10 310/90 |
| 2002/0136613 | A1 | * | 9/2002 | Tidwell  | .................... B23Q 5/54 409/201 |
| 2005/0196246 | A1 | * | 9/2005 | Kojima   | ................ B23Q 11/127 409/135 |
| 2010/0024206 | A1 | * | 2/2010 | Mizuta   | ................... B23Q 1/012 29/700 |
| 2010/0322734 | A1 | * | 12/2010 | Tatsuda | ................ B23Q 1/0009 409/231 |

FOREIGN PATENT DOCUMENTS

| JP | S62-39934  U | 3/1987  |
| JP | 02-076601  A | 3/1990  |
| JP | 04-343638  A | 11/1992 |
| JP | 11-320211  A | 11/1999 |
| JP | 2005-246545 A | 9/2005  |
| JP | 2005-297076 A | 10/2005 |
| JP | 2009-214187 A | 9/2009  |

* cited by examiner

*Primary Examiner* — Nicole N Ramos
(74) *Attorney, Agent, or Firm* — Hauptman Ham, LLP

(57) ABSTRACT

A machine tool for cutting a workpiece with a cutting tool, includes a spindle motor that generates heat, a spindle head for supporting the spindle motor, and a heat insulating sheet disposed between the spindle motor and the spindle head. The area of a part of the heat insulating sheet that is in contact with a part of the spindle head having a high heat capacity is small so as to increase the amount of heat transferring from the spindle motor to the part of the spindle head having a high heat capacity, and thereby make the temperature distribution of the spindle head uniform.

5 Claims, 8 Drawing Sheets

MACHINE TOOL

CROSS-REFERENCE TO RELATED APPLICATION

This application is based upon and claims the benefit of priority from Japanese Patent Application No. 2016-220993 filed on Nov. 11, 2016, the contents of which are incorporated herein by reference.

BACKGROUND OF THE INVENTION

Field of the Invention

The present invention relates to a machine tool for cutting a workpiece with a tool.

Description of the Related Art

Japanese Laid-Open Patent Publication No. 2005-297076 discloses a configuration in which a first member and a second member having heat insulating properties are tightly pushed into a gap between each of motor shaft claws provided on a motor shaft and each of spindle claws provided on a spindle. Japanese Laid-Open Patent Publication No. 04-343638 discloses a configuration in which a heat insulating member is provided between a spindle and a rotor of a motor for rotationally driving the spindle. Japanese Laid-Open Patent Publication No. 11-320211 discloses a configuration in which a ball screw nut of a ball screw for driving an X-axis table is fixed to a lower surface of a slider via a heat insulating material. Japanese Laid-Open Patent Publication No. 02-076601 discloses a configuration in which a heat insulating member is provided between a head and a head driving means.

SUMMARY OF THE INVENTION

In the technologies of Japanese Laid-Open Patent Publication No. 2005-297076, Japanese Laid-Open Patent Publication No. 04-343638, Japanese Laid-Open Patent Publication No. 11-320211, and Japanese Laid-Open Patent Publication No. 02-076601, a heat insulating member or the like is provided between a heat generating portion and a supporting portion that supports the heat generating portion so as to suppress heat conduction from the heat generating portion to the supporting portion and reduce thermal displacement of the supporting portion. In general, however, there is no heat insulating material made of metal, so that it is impossible to achieve complete insulation when the heat generating portion and the supporting portion are joined to each other with a heat insulating material being interposed therebetween since it is not possible to ensure the precision of the machine tool. Thus, in general, the heat generating portion and the supporting portion are directly coupled at some locations, and typically connected by use of metallic bolts, so that it is impossible to completely eliminate heat conduction from the heat generating portion to the supporting portion, and hence thermal displacement of the supporting portion cannot be avoided. Further, in the supporting portion, since the heat capacity varies from one part to another depending on the shape, the amount of thermal displacement varies from one part of the supporting portion to another. Therefore, the supporting portion not only expands in the axial direction but also inclines with respect to the axial direction, and as a result, the posture of the supporting portion changes, which causes an accuracy deterioration problem in the machine tool.

The present invention has been devised to solve the above-described problems, and it is therefore an object of the present invention to provide a machine tool capable of suppressing deformation of the posture of a supporting portion due to thermal displacement.

According to an aspect of the present invention, there is provided a machine tool for cutting a workpiece with a tool, including: a heat generating portion that generates heat; a supporting portion configured to support the heat generating portion; and a sheet-shaped heat insulating member disposed between the heat generating portion and the supporting portion. In this arrangement, the area of a part of the heat insulating member that is in contact with a part of the supporting portion having a high heat capacity is small so as to increase the amount of heat transferring from the heat generating portion to the part of the supporting portion having a high heat capacity, and thereby reduce non-uniformity of the temperature distribution of the supporting portion.

According to the present invention, it is possible to suppress deformation of the posture due to thermal displacement of the supporting portion.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A machine tool according to preferred embodiments of the present invention will be detailed hereinbelow with reference to the accompanying drawings.

[Overall Structure of Machine Tool]

Figure 1:
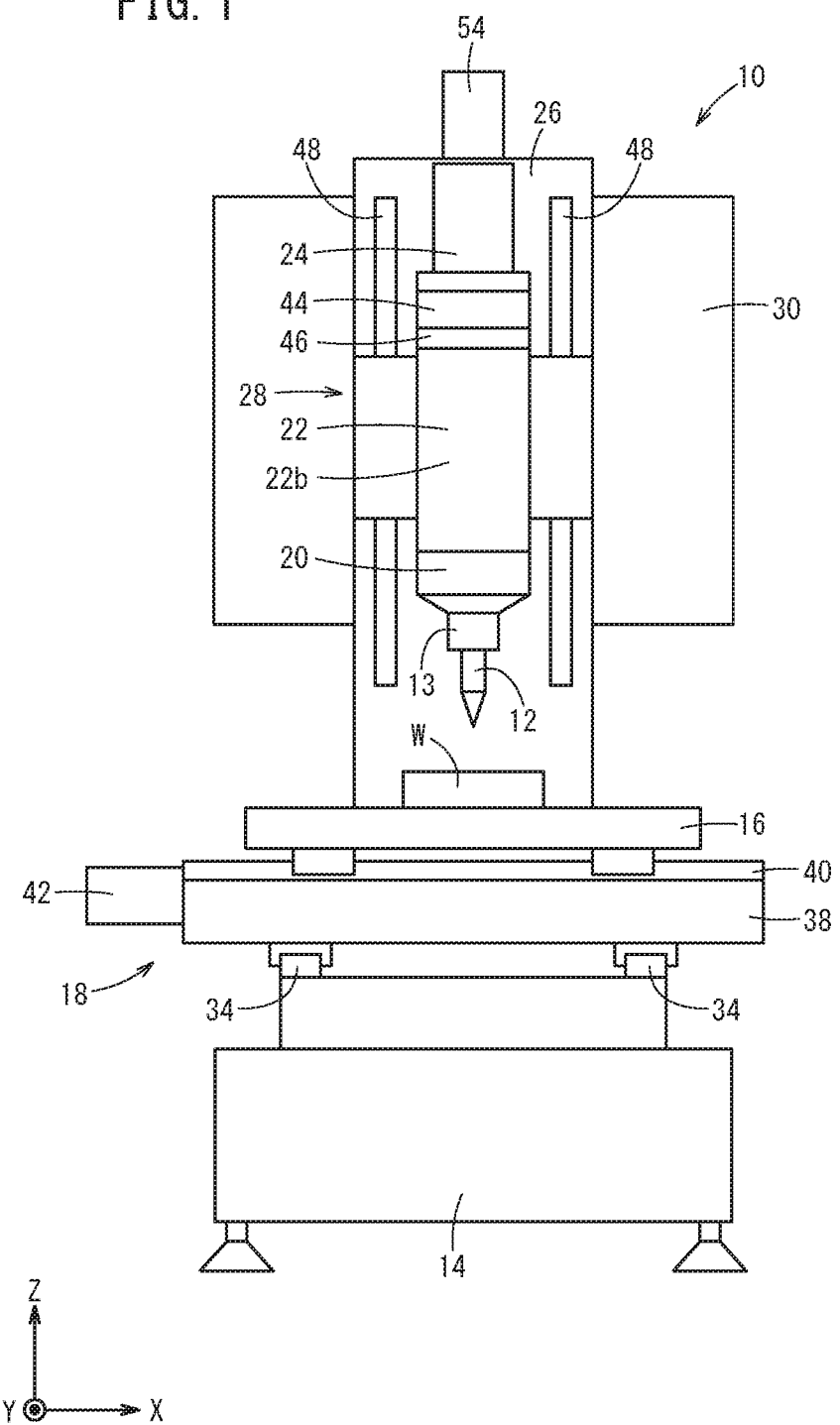
FIG. 1 is a schematic front view of a machine tool.
Figure 2:
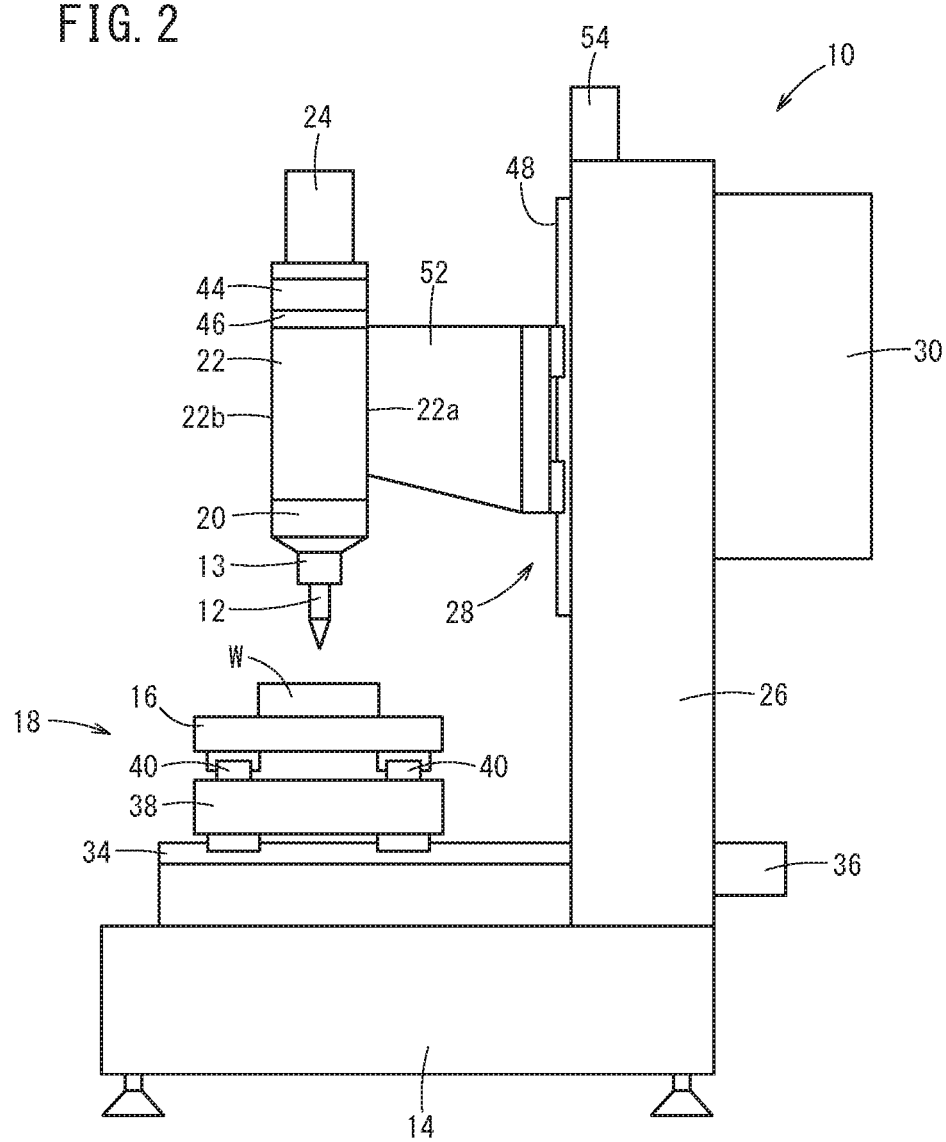
FIG. 2 is a schematic side view of the machine tool.

FIG. 1 is a schematic front view of a machine tool 10. FIG. 2 is a schematic side view of the machine tool 10. The machine tool 10 performs cutting of a workpiece W with a cutting tool 12 such as a drill held by a cutting tool holder 13. The machine tool 10 has a bed 14, a table 16, a table driving mechanism 18, a spindle 20, a spindle head 22, a spindle motor 24, a column 26, a spindle head driving mechanism 28, and a control device 30.

The workpiece W is fixed on the table 16. The table driving mechanism 18 moves the table 16 in the X-axis direction and the Y-axis direction. The X-axis and the Y-axis are axes orthogonal to each other, extending on the plane of the top surface of the table 16.

The table driving mechanism 18 is mounted on the bed 14. The table driving mechanism 18 has Y-axis rails 34, a Y-axis motor 36, a saddle 38, X-axis rails 40 and an X-axis motor 42.

The Y-axis rails 34 are arranged on the bed 14 so as to extend in the Y-axis direction. The saddle 38 is placed on the Y-axis rails 34 so as to be movable in the Y-axis direction. The Y-axis motor 36 is a servomotor and coupled to the saddle 38 via a ball screw mechanism (not shown). As the Y-axis motor 36 is driven, the Y-axis motor 36 moves the saddle 38 in the Y-axis direction. The Y-axis motor 36 is supported on the bed 14.

The X-axis rails 40 are provided on the saddle 38 so as to extend in the X-axis direction. The table 16 is installed movably on the X-axis rails 40 in the X-axis direction. The X-axis motor 42 is a servomotor and coupled to the table 16 via a ball screw mechanism (not shown). As the X-axis motor 42 is driven, the X-axis motor 42 moves the table 16 in the X-axis direction. The X-axis motor 42 is supported by the saddle 38. The workpiece W placed on the table 16 can be moved in the X-axis direction and the Y-axis direction by the table driving mechanism 18.

The spindle head 22 is formed of an iron-based metal. The spindle head 22 supports the spindle 20 so as to be rotatable about the Z-axis via an unillustrated bearing. The spindle 20 is rotationally driven by a spindle motor 24. The spindle motor 24, together with a spacer 44 and a heat insulating sheet 46, is fastened to the spindle head 22 by bolts (not shown). The spindle 20 detachably holds the cutting tool holder 13.

A neck portion 52 is located adjacent to a back face 22a of the spindle head 22. The neck portion 52 is coupled with Z-axis rails 48 of the spindle head driving mechanism 28. The spindle head 22 is integrally configured with the neck portion 52. The spindle head driving mechanism 28 includes Z-axis rails 48, a Z-axis motor 54, and an unillustrated ball screw mechanism. The Z-axis rails 48 are arranged on the column 26 so as to extend in the Z-axis direction. The Z-axis motor 54 is a servomotor and coupled to the spindle head 22 via the ball screw mechanism. As the Z-axis motor 54 is driven, the Z-axis motor 54 moves the spindle head 22 in the Z-axis direction. The Z-axis motor 54 is supported by the column 26. The spindle head driving mechanism 28 enables the spindle 20 to move in the Z-axis direction. The movement of the spindle 20 in the Z-axis direction together with the movement of the table 16 in the X-axis direction and the Y-axis direction enables the machine tool 10 to machine the workpiece W into a desired three-dimensional shape.

The control device 30 includes a processing unit, a storage unit, a power circuit, and the like, and calculates and outputs control signals for driving the spindle motor 24, the Y-axis motor 36, the X-axis motor 42, the Z-axis motor 54, etc., in accordance with a program stored in the storage unit or under operation of an operator. The control device 30 is supported on the back side of the column 26.

[Configuration of Spacer and Heat Insulating Sheet]

Figure 3:
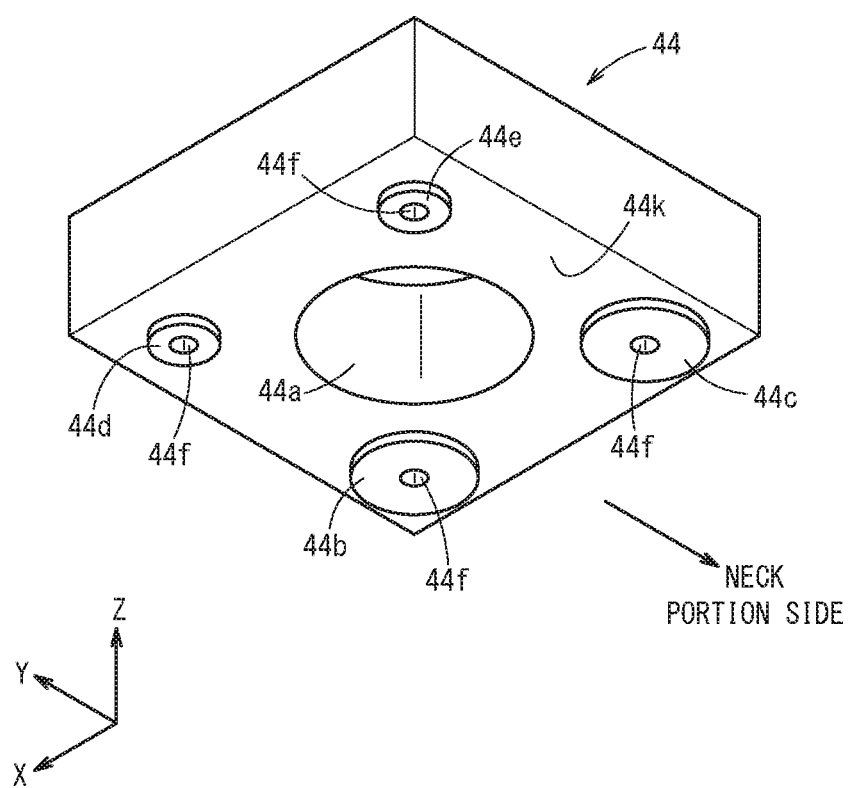
FIG. 3 is a perspective view of a spacer.

FIG. 3 is a perspective view of the spacer 44. The spacer 44 is formed of an iron-based metal. The spacer 44 is formed in a substantially rectangular parallelepiped as shown in FIG. 3. In the spacer 44, a through hole 44a penetrating in the axial direction is formed. An unillustrated rotational shaft of the spindle motor 24 is inserted into the through hole 44a.

Four legs 44b to 44e are formed on a surface 44k of the spacer 44 on the spindle head 22 side. The legs 44b to 44e are cylindrical protrusions formed on the surface 44k of the spacer 44 on the spindle head 22 side. A bolt hole 44f through which a bolt (not shown) passes is formed in each of the legs 44b to 44e. In a state where the spacer 44 is fastened to the spindle head 22, the legs 44b to 44e are in direct contact with the spindle head 22. Direct contact of the metal spindle head 22 with the metal legs 44b to 44e ensures dimension accuracy in the axial direction from the spindle motor 24 to the spindle head 22. Further, the shapes of the legs 44b to 44e are not limited to cylindrical shapes but may be any arbitrary shape.

The spindle head 22 varies in heat capacity from one part of the spindle head to another depending on its shape. Since the neck portion 52 is joined to the back face 22a side of the spindle head 22, part of the heat dissipates from the spindle head 22 to the neck portion 52 side, so the heat capacity on the joint area is high. On the other hand, the heat capacity in the vicinity of a front face 22b of the spindle head 22 is low since there is no place for heat to dissipate.

The cross-section areas of the legs 44b to 44e are determined based on the difference in heat capacity of the spindle head 22. That is, the cross-section areas of the legs 44b and 44c located near to the neck portion 52 are formed greater than those of the legs 44d and 44e located far from the neck portion 52. With this configuration, the amount of heat transferring from the spindle motor 24 (spacer 44) to the spindle head 22 becomes greater on the back face 22a side of the spindle head 22 and smaller on the front face 22b side of the spindle head 22, so that the temperature distribution of the spindle head 22 can be made uniform, and hence it is possible to make the thermal displacement amount uniform.

Figure 4:
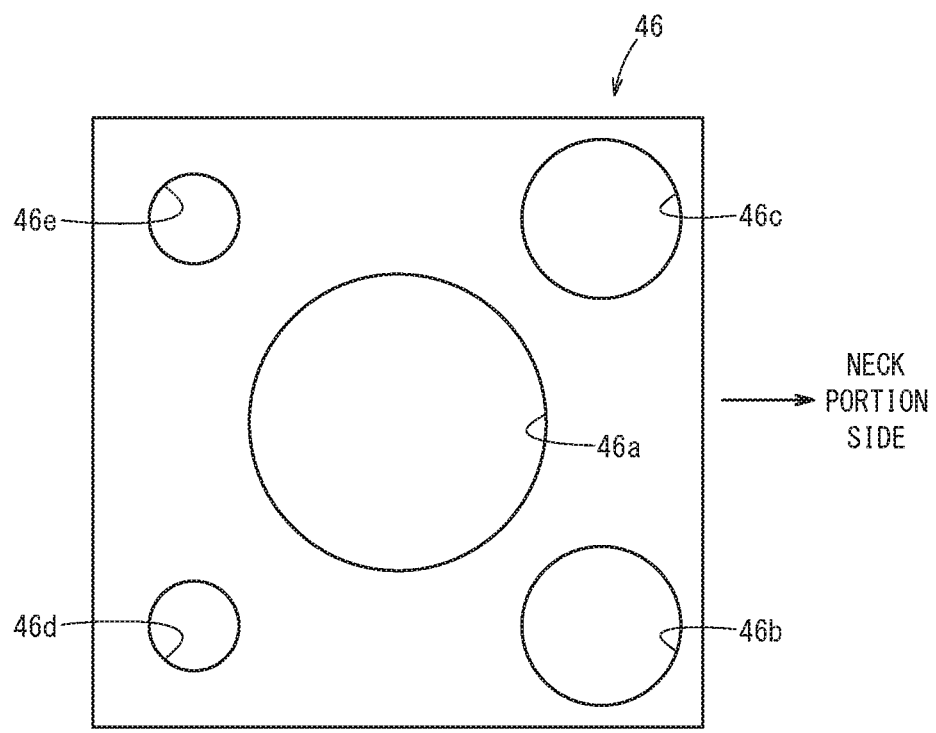
FIG. 4 is a front view of a heat insulating sheet.

FIG. 4 is a front view of the heat insulating sheet 46. The heat insulating sheet 46 is a sheet-shaped member containing, for example, silica or the like. The outer shape of the heat insulating sheet 46 is formed substantially the same as that of the surface 44k of the spacer 44 that is closer to the spindle head 22. In the heat insulating sheet 46, a through hole 46a is formed at a position corresponding to the through hole 44a of the spacer 44. The rotational shaft (not shown) of the spindle motor 24 is inserted in the through hole 46a. The heat insulating sheet 46 has insertion holes 46b to 46e formed at respective positions corresponding to the legs 44b to 44e of the spacer 44. The legs 44b to 44e are inserted in the insertion holes 46b to 46e.

The cross-section areas of the insertion holes 46b to 46e are determined based on the heat capacity of the spindle head 22. That is, the areas of the insertion holes 46b, 46c located near to the neck portion 52 are larger than the areas of the insertion holes 46d, 46e located remote from the neck portion 52. As a result, the area of a part of the heat insulating sheet 46 that is located near to the neck portion 52 is smaller than the area of another part of the heat insulating sheet 46 that is located remote from the neck portion 52. Therefore, the amount of heat transmitted from the spindle motor 24 (spacer 44) to the spindle head 22 becomes greater on the back face 22a side of the spindle head 22 and smaller on the front face 22b side of the spindle head 22, so that the temperature distribution of the spindle head 22 is made uniform, and hence it is possible to make the thermal displacement amount uniform.

In the present embodiment, the cross-section areas of the legs 44b to 44e and the cross-section areas of the insertion holes 46b to 46e are formed to be substantially identical. However, the cross-section areas of the insertion holes 46b to 46e may be arbitrarily formed as long as the legs 44b to 44e can be inserted. In addition, the insertion holes 46b to 46e may have any shape.

[Operation and Effect]

Figure 5:
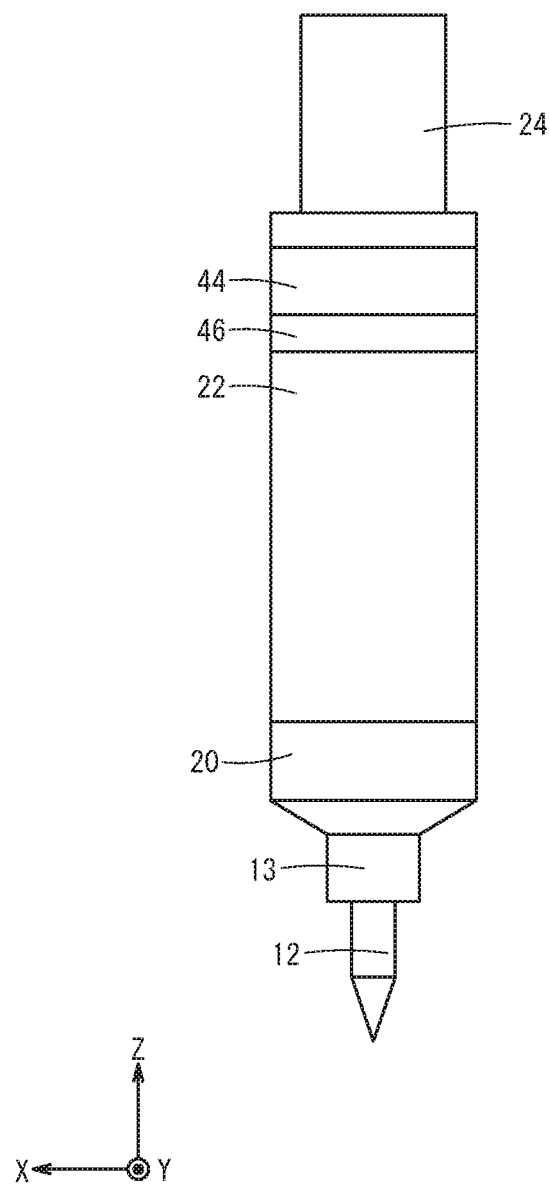
FIG. 5 is a diagram for explaining thermal displacement of a spindle head.
Figure 6:
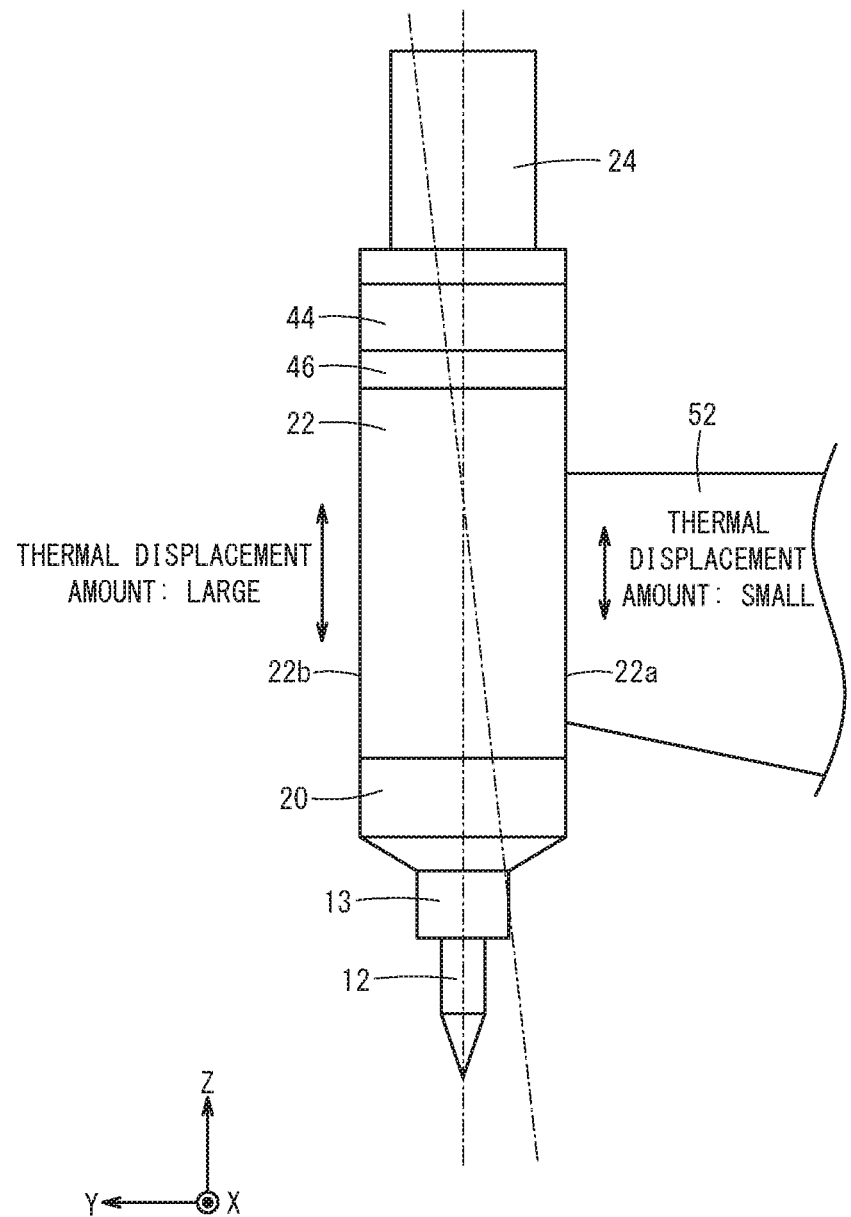
FIG. 6 is a diagram for explaining thermal displacement of the spindle head.

FIGS. 5 and 6 are diagrams for explaining the thermal displacement of the spindle head 22. FIG. 5 is a front view of the spindle head 22, and FIG. 6 is a side view of the spindle head 22. Heat generated when the spindle motor 24 is driven is transmitted to the spindle head 22, so that thermal displacement is caused in the spindle head 22. In order to suppress such thermal displacement of the spindle head 22, the heat insulating sheet 46 is provided between the spindle motor 24 and the spindle head 22. However, it is impossible to completely block the transmission of heat from the spindle motor 24 to the spindle head 22.

Since the neck portion 52 is located on the back face 22a of the spindle head 22, the heat capacity of the back face side is higher than that of the front face 22b side of the spindle head 22. If the same amount of heat is transmitted to the front face 22b side and the back face 22a side of the spindle head 22, the temperature on the front face 22b side of the spindle head 22 becomes higher than the temperature on the back face 22a side of the spindle head 22. Therefore, the amount of thermal displacement on the front face 22b side of the spindle head 22 is greater, and the thermal displacement amount on the back face 22a side of the spindle head 22 becomes smaller. As a result, though the axis of the spindle 20 is not inclined when the spindle head 22 is viewed from the front as shown in FIG. 5, there is a risk of the axis of the spindle 20 being inclined when the spindle head 22 is viewed from the side surface as shown in FIG. 6.

It should be noted that even if the spindle head 22 undergoes such thermal displacement as to expand and shrink in the Z-axis, X-axis and Y-axis directions, it is possible to cancel out the influence of the thermal displacement of the spindle head 22 by compensating the driving amounts of the Z-axis motor 54, the X-axis motor 42 and the Y-axis motor 36, as long as the axis of the spindle 20 is not tilted. However, deterioration of the geometrical accuracy caused by the inclination of the axis of the spindle 20 cannot be compensated by the driving amounts of the Z-axis motor 54, the X-axis motor 42, and the Y-axis motor 36. The present embodiment is intended to suppress the occurrence of such a thermal displacement of the spindle head 22 as to cause inclination of the axis of the spindle 20, though thermal displacements of the spindle head 22 to some extent are tolerated.

To achieve this, the present embodiment includes the spindle motor 24 (heat generating portion) that generates heat, the spindle head 22 (supporting portion) that supports the spindle motor 24, and the heat insulating sheet 46 (heat insulating member) arranged between the spindle motor 24 and the spindle head 22. In this arrangement, the area of a part of the heat insulating sheet 46 that is in contact with a part of the spindle head 22 having a high thermal capacity is made small so as to increase the amount of heat transferring from the spindle motor 24 to the spindle head 22, and thereby make the temperature distribution of the entire spindle head 22 uniform. By determining the area (areas of parts) of the heat insulating sheet 46 in accordance with the heat capacity of the spindle head 22, the thermal displacement of the spindle head 22 becomes uniform, and it is hence possible to suppress the inclination of the axis of the spindle 20.

Further, in this embodiment, the heat insulating sheet 46 has multiple insertion holes 46b to 46e (through holes) while legs 44b to 44e (joint members) contacting both the spindle motor 24 and the spindle head 22 are provided and inserted in the insertion holes 46b to 46e. Some of the legs 44b to 44e which come in contact with a part of the spindle head 22 having a high heat capacity are made to have a greater cross-section area so as to increase the amount of heat transferring from the spindle motor 24 to the spindle head 22, and thereby make the temperature distribution of the entire spindle head 22 uniform. By determining the cross-section areas of the legs 44b to 44e in accordance with the heat capacity of the spindle head 22, the thermal displacement of the spindle head 22 becomes uniform, and it is hence possible to suppress the inclination of the axis of the spindle 20.

OTHER EMBODIMENTS

Although the embodiments of the present invention have been described above, the specific configuration of the invention is not limited to the above embodiments, but changes in design and the like without departing from the gist of the present invention should also be included in the present invention.

Figure 7:
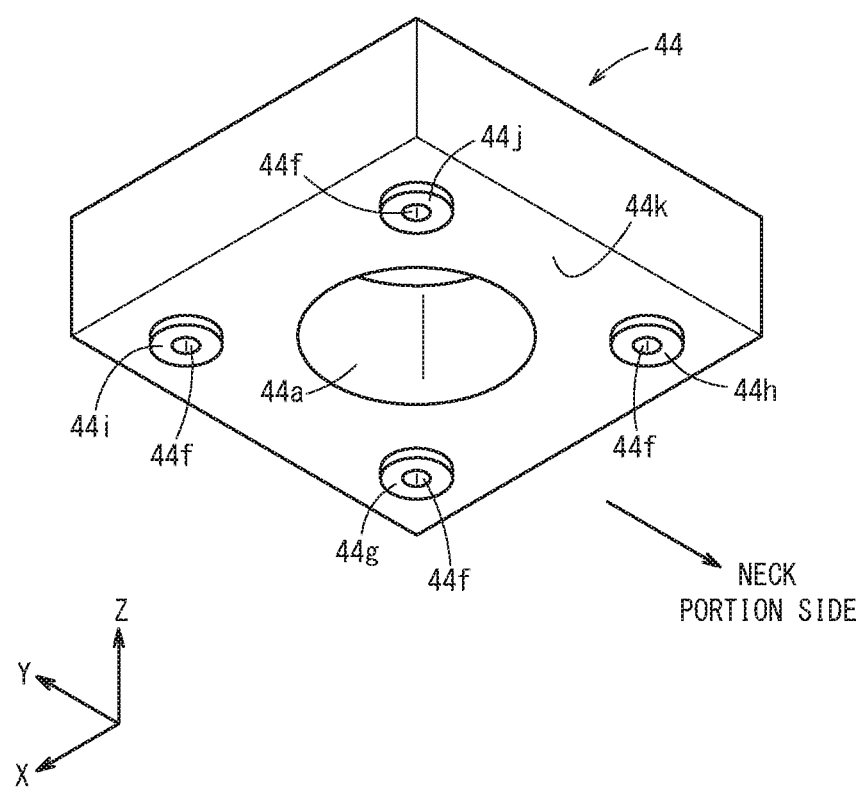
FIG. 7 is a perspective view showing a spacer according to a modification.
Figure 8:
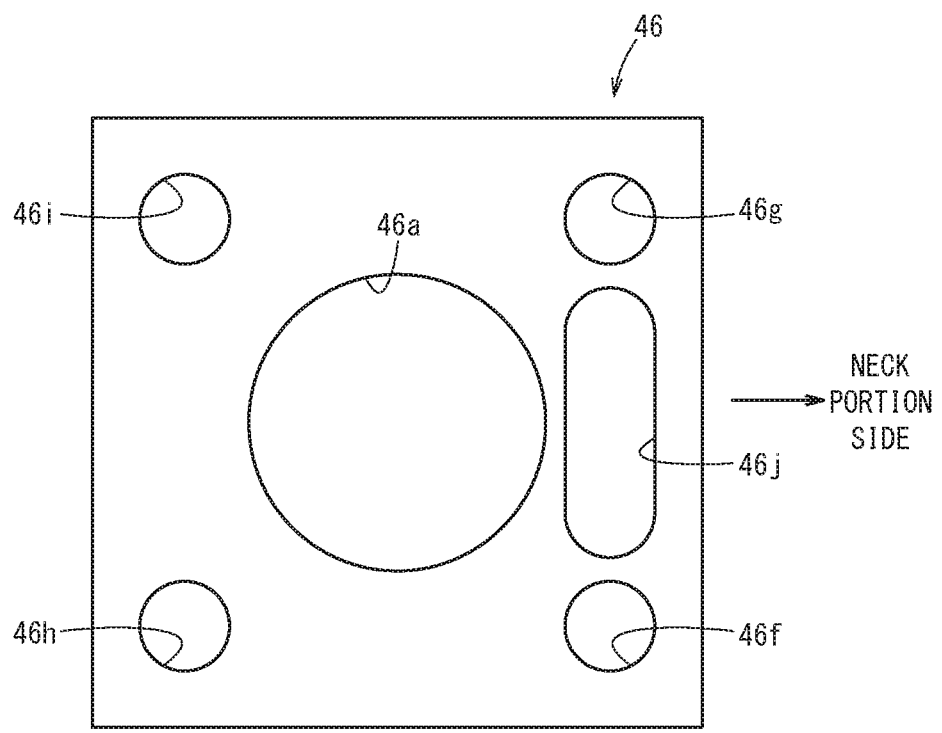
FIG. 8 is a front view showing a heat insulating sheet according to a modification.

For example, as shown in FIG. 7, the cross-section areas of the legs 44g to 44j of the spacer 44 may be all set at the same size while the areas of the insertion holes 46f to 46i in the heat insulating sheet 46 may be all set at the same size, as shown in FIG. 8. In this case, a new through hole 46j should be formed in a part of the heat insulating sheet 46 that is located near to the neck portion 52. This makes it possible to reduce the area of the part of the heat insulating sheet 46 near the neck portion 52.

Further, as shown in FIG. 7, the cross-section areas of the legs 44g to 44j of the spacer 44 may be all set at the same size while the areas of the insertion holes 46b to 46e in the heat insulating sheet 46 may be varied as shown in FIG. 4.

In the above embodiment, the legs 44b to 44e are formed on the spacer 44, but it is also possible to form the legs on the spindle head 22. Instead of the legs 44b to 44e, ring-shaped members formed separately from the spacer 44 may be provided.

Further, the spindle motor 24 may be attached to the spindle head 22 via the heat insulating sheet 46 without providing the spacer 44. In this case, legs may be formed on the spindle motor 24 and/or the spindle head 22.

Further, the structure described in the above embodiment can be applied not only between the spindle motor 24 and the spindle head 22, but also between a heat generating portion that generates heat and a supporting portion that supports the heat generating portion. For example, a structure similar to the structure described in the above embodiment may be applied between the control device 30 having a power circuit and the column 26. Further, a structure similar to that described in the above embodiment may be applied between the Y-axis motor 36 and the bed 14, between the X-axis motor 42 and the saddle 38, and between the Z-axis motor 54 and the column 26.

What is claimed is:

1. A machine tool for cutting a workpiece with a tool, comprising:
   a spindle that holds the tool;
   a spindle head that supports the spindle;
   a heat generating portion that generates heat and is supported by a first side surface of the spindle head wherein the first side surface and a side where the tool is attached to the spindle are on opposite sides of the spindle head;
   a neck portion that is attached to a second surface that is located in a direction perpendicular to an axis of the tool attached to the spindle;

a sheet-shaped heat insulating member that is disposed between the heat generating portion and the spindle head and has a plurality of through holes; and a plurality of joint members that are inserted into at least some of the through holes and contact both the heat generating portion and the spindle head, wherein an area of the through holes that are provided closer to the second surface is larger than an area of the through holes that are provided farther from the second surface, a cross-sectional area of the joint members is smaller than an area of the through holes into which the joint members are inserted, a cross-sectional area of the joint members that are provided closer to the second surface is equal to or more than a cross-sectional area of the joint members that are provided farther from the second surface.

2. The machine tool according to claim 1, further comprising joint members, wherein:

an area of the through holes that are provided closer to the second surface and into which the joint members are inserted is larger than an area of the through holes that are provided farther from the second surface and into which the joint members are inserted, and a cross-sectional area of the joint members that are provided closer to the second surface is larger than a cross-sectional area of the joint members that are provided farther from the second surface.

3. The machine tool according to claim 1, wherein an area of the through holes that are provided closer to the second surface and into which the joint members are inserted is larger than an area of the through holes that are provided farther from the second surface and into which the joint members are inserted, and a cross-sectional area of the joint members that are provided closer to the second surface is equal to a cross-sectional area of the joint members that are provided farther from the second surface.

4. The machine tool according to claim 1, wherein an area of the through holes that are provided closer to the second surface and into which the joint members are inserted is equal to an area of the through holes that are provided farther from the second surface and into which the joint members are inserted, a cross-sectional area of the joint members that are provided closer to the second surface is equal to a cross-sectional area of the joint members that are provided farther from the second surface, and the heat insulating member has the through holes that are provided closer to the second surface and into which the joint members are not inserted.

5. The machine tool according to claim 1, wherein the heat generating portion is a spindle motor configured to rotationally drive the tool.

* * * * *